(12) United States Patent
Sarkisian et al.

(10) Patent No.: US 7,622,513 B2
(45) Date of Patent: Nov. 24, 2009

(54) INKJET PRINTING SYSTEM THAT PROVIDES IMPROVED MOTTLE

(75) Inventors: George Sarkisian, San Diego, CA (US); Keshava A. Prasad, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 11/001,387

(22) Filed: Dec. 1, 2004

(65) Prior Publication Data

US 2006/0116439 A1    Jun. 1, 2006

(51) Int. Cl.
*C09D 11/00* (2006.01)

(52) U.S. Cl. ...................... 523/160; 529/161

(58) Field of Classification Search ................ 523/160, 523/161
See application file for complete search history.

(56) References Cited

U.S. PATENT DOCUMENTS

| | | | |
|---|---|---|---|
| 6,036,759 A | 3/2000 | Wickramanayake et al. | |
| 6,281,269 B1 | 8/2001 | Schut | |
| 6,379,443 B1 | 4/2002 | Komatsu et al. | |
| 6,450,632 B1 | 9/2002 | Tsang et al. | |
| 6,461,418 B1 | 10/2002 | Yue et al. | |
| 6,503,307 B1 | 1/2003 | Noguchi | |
| 6,726,757 B2 | 4/2004 | Sarkisian et al. | |
| 6,740,689 B1 | 5/2004 | Lee et al. | |
| 6,908,185 B2 * | 6/2005 | Chen et al. | ........ 347/96 |
| 2004/0024083 A1 | 2/2004 | Lee | |
| 2004/0085418 A1 | 5/2004 | Yau et al. | |

FOREIGN PATENT DOCUMENTS

| | | |
|---|---|---|
| EP | 0 924 272 A | 6/1999 |
| EP | 0924272 | 6/1999 |
| EP | 1 258 510 A | 11/2002 |

\* cited by examiner

*Primary Examiner*—Edward J Cain

(57) ABSTRACT

An inkjet printing system that includes a fixer fluid and a pigment-based inkjet ink. The fixer fluid includes a cationic polymer and an acidic crashing agent. The inkjet ink includes an anionic pigment and at least one of the following: at least one nonionic surfactant present in the inkjet ink at less than or equal to approximately 0.1% by weight, at least one anionic binder present in the inkjet ink at less than or equal to approximately 2% by weight, and less than or equal to approximately 20% by weight of at least one organic solvent.

41 Claims, No Drawings

INKJET PRINTING SYSTEM THAT PROVIDES IMPROVED MOTTLE

FIELD OF THE INVENTION

The present invention relates to an inkjet printing system for use in inkjet printing. More specifically, the present invention relates to an inkjet ink and a fixer fluid that provide a printed image having improved mottle.

BACKGROUND OF THE INVENTION

Inkjet printing is a nonimpact process of printing text or images by depositing inkjet ink on a print medium. The inkjet ink includes an ink vehicle and a colorant, such as a dye or a pigment. Pigment-based inkjet inks produce printed images that have good waterfastness and lightfastness in comparison to images produced with dye-based inkjet inks. In addition, pigment-based inkjet inks are formulated to have fast drytimes and to provide good durability to the printed image. While pigment-based inkjet inks have these desirable properties, the pigments are typically insoluble in the aqueous-based ink vehicles. Therefore, the pigments must be stably dispersed to prevent agglomeration or settling out of the ink vehicle.

To form stable pigment dispersions, dispersants or surfactants are added to the ink vehicle. The dispersant is typically a polymer that binds to a surface of the pigment, providing stability to the pigment dispersion. When printing is desired, the pigment is precipitated from the inkjet ink and onto the print medium by solvent evaporation. Alternatively, the pigment is stably dispersed by covalently attaching solubilizing groups, such as polymeric, ionic, or organic groups, to the surface of the pigment. These pigments are referred to in the art as self-dispersed pigments or surface-modified pigments. One category of self-dispersed pigments includes polymer-attached pigments. As used herein, the term "polymer-attached pigment" refers to a pigment having at least one polymer covalently attached to the surface of the pigment.

Inkjet inks that include polymer-attached pigments have numerous advantages, such as fast drytimes, which are typically less than 10 seconds. In addition, when the inkjet inks are printed on a porous paper, the resulting images have good durability (typically less than 100 milli-Optical Density ("mOD") as measured by a 2-Pass Alkaline highlighter smear test), which is due to large amounts of binder and surfactant present in the inkjet inks. However, the printed images also exhibit poor mottle. Mottling is an uneven print density that results in a splotchy appearance of light and dark areas. Mottling commonly occurs in solid area fills, such as in graphics, when black or cyan inkjet inks are used. A visible mottle rating for these inkjet inks is usually 6 or less, out of a scale from 1 (worst) to 10 (best). These inkjet inks typically include greater than 20% of a binder, greater than 0.1% of a surfactant, and greater than 20% organic solvents. When the inkjet inks having polymer-attached pigments are printed with a cationic fixing system, which includes a cationic polymer and an acidic crashing agent, coalescence effects occur due to the large amounts of binder and surfactant that are present. The cationic fixing system is used in combination with the inkjet inks to improve the durability and image quality of the printed image. The coalescence effects produce a mottled appearance in a complete blackout print area on the porous paper.

It would be desirable to produce a pigment-based inkjet ink that provides improved mottle on porous paper and does not produce coalescence effects with a cationic fixing system.

BRIEF SUMMARY OF THE INVENTION

The present invention relates to an inkjet printing system that includes a fixer fluid and an inkjet ink. The fixer fluid includes a cationic polymer and an acidic crashing agent. The inkjet ink includes an anionic pigment and at least one of the following: at least one nonionic surfactant present in the inkjet ink at less than or equal to approximately 0.1% by weight, at least one anionic binder present in the inkjet ink at less than or equal to approximately 2% by weight, and less than or equal to approximately 20% by weight of at least one organic solvent.

DETAILED DESCRIPTION OF THE INVENTION

An inkjet ink that provides improved mottle when printed is disclosed. The inkjet ink is applied to a print medium in combination with a fixer fluid to produce a printed image having improved mottle. The improved mottle is achieved without substantially affecting optical density ("OD") or durability of the printed image or decap and drytime of the inkjet ink. To achieve the improved mottle, the inkjet ink may include at least one of a reduced amount of a charged species, a reduced amount of a surfactant, and a reduced concentration of organic solvents in the inkjet ink relative to the amount of charged species, the amount of surfactant, or the concentration of organic solvents in a conventional inkjet ink. The charged species in the inkjet ink may be an anionic ingredient, such as an anionic binder. Reducing the amount of the charged species in the inkjet ink may be accomplished by decreasing the amount of the binder in the inkjet ink or by using uncharged, or nonionic, surfactants in the inkjet ink.

The amounts of the ingredients in the inkjet ink and the fixer fluid are expressed in weight percent ("wt %") of a total weight of the inkjet ink and of the fixer fluid, respectively. The purity of all ingredients is that used in normal commercial practice for inkjet inks and fixer fluids.

The inkjet ink includes a pigment that is dispersible or dissolvable in an aqueous ink vehicle without using additional dispersants. The pigment may have an anionic charge that is provided by at least one anionic or anionizable group. As used herein, the term "anionizable group" refers to an ionizable group that is capable of forming an anion. For instance, the anionic or anionizable group may be an acidic group or a salt of the acidic group that is present on the pigment. The anionic or anionizable group may be directly attached to the surface of the pigment. Alternatively, the anionic or anionizable group may be attached to a small organic molecule or polymer, which is attached to the pigment. The acidic group may be a derivative of an organic acid, such as a carboxylic acid group, a hydroxyl group, a sulfonic acid group, a sulfuric acid group, or a phosphonic acid group. In addition, mixtures of different types of acidic groups may be present on the pigment. The anionic or anionizable group on the pigment may provide a reaction site for the precipitation of the anionic pigment with the fixer fluid on a surface of the print medium. The anionic pigment may be any pigment having an anionic charge, such as an anionic polymer-attached pigment or an anionic self-dispersed pigment. The anionic pigment may be present in the inkjet ink in an amount ranging from approximately 1 wt % to approximately 30 wt %, such as from approximately 1 wt % to approximately 10 wt %.

The polymer attached to the pigment may include, but is not limited to, polystyrene, styrene/acrylic copolymers, styrene/acrylic ester copolymers, polyacrylic esters, polymethacrylic esters, polyethylacrylate, styrene/butadiene copolymers, butadiene copolymers, polyurethane polymers, acrylonitrile/butadiene copolymers, chloroprene copolymers, crosslinked acrylic resins, crosslinked styrene resins, vinylidene fluoride, benzoguanamine resins, polyethylene resins, polypropylene resins, styrene/methacrylic ester copolymers, styrene/acrylamide copolymers, n-isobutyl acrylate, vinyl acetate, acrylamide, polyvinyl acetal, rosin resins, vinylidene chloride resins, ethylene/vinyl acetate copolymers, vinyl acetate/acryl copolymers, and vinyl chloride resin. The polymer may be loaded onto the pigment in a range of approximately 20% to approximately 30% of the pigment weight.

The inkjet ink may be a cyan, yellow, magenta, or black inkjet ink. As such, the anionic pigment may include a conventional organic pigment. The anionic pigment may be a black pigment or a colored pigment, such as a blue, brown, cyan, green, white, violet, orange, magenta, red, or yellow pigment. In addition, mixtures of colored pigments or mixtures of black and colored pigments may be used. The anionic pigment may be a carbon black pigment, such as a channel black, a furnace black, or a lamp black. Examples of carbon blacks include those sold under the Regal®, Black Pearls®, Elftex®, Monarch®, Mogul®, and Vulcan® trademarks, which are available from Cabot Corporation (Boston, Mass.). The carbon black may include, but is not limited to, Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcane P. Other carbon blacks include, but are not limited to, Printex 40, Printex 80, Printex 300, Printex L, Printex U, Printex V, Special Black 4, Special Black 5, FW1, FW2, FW18, and FW200, which are available from Degussa Corporation (Ridgefield, N.J.); Raven 780, Raven 890, Raven 1020, Raven 1040, Raven 1255, Raven 1500, Raven 5000, Raven 5250, which are available from Colombian Chemical Corporation (Atlanta, Ga.); and MA100 and MA440, which are available from Mitsubishi Chemical Corporation (Tokyo, Japan).

Suitable classes of colored pigments include, but are not limited to, anthraquinones, phthalocyanine blues, phthalocyanine greens, diazos, monoazos, pyranthrones, perylenes, heterocyclic yellows, quinacridones, and (thio)indigoids. Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyranthrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 93, Pigment Yellow 151, Pigment Yellow 154, Pigment Yellow 155, Pigment Yellow 117, Pigment Yellow 128, Pigment Yellow 138, Pigment Yellow 109, Pigment Yellow 110, and Pigment Yellow 213. These pigments are commercially available in either powder or press cake form from a number of sources including, BASF Corp. (Mount Olive, N.J.), Engelhard Corp. (Iselin, N.J.), CIBA Corp. (Tarrytown, N.Y.), Clariant Corp. (Coventry, R.I.), or Sun Chemical Corp. (Cincinnati, Ohio).

The pigment may also include the Hostafine® series of pigments, such as Hostafin® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), which are available from Clariant GmbH (Muttenz, Switzerland); Normandy Magenta RD-2400 (Paul Uhlich), Paliogen Violet 5100 (BASF Corp.), Paliogen® Violet 5890 (BASF Corp.), Permanent Violet VT2645 (Paul Uhlich), Heliogen Green L8730 (BASF Corp.), Argyle Green XP-111-S (Paul Uhlich), Brilliant Green Toner GR 0991 (Paul Uhlich), Heliogen® Blue L6900, L7020 (BASF Corp.), Heliogen® Blue D6840, D7080 (BASF Corp.), Sudan Blue OS (BASF Corp.), PV Fast Blue B2GO1 (American Clariant), Irgalite Blue BCA (Ciba), Paliogen® Blue 6470 (BASF Corp.), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF Corp.), Paliogen® Orange 3040 (BASF Corp.), Ortho Orange OR 2673 (Paul Uhlich), Paliogen® Yellow 152, 1560 (BASF Corp.), Lithol Fast Yellow 0991 K (BASF Corp.), Paliotol Yellow 1840 (BASF Corp.),. Novoperm® Red BN (Clariant), Novoperm® Yellow FG 1 (Clariant), Permanent Yellow YE 0305 (Paul Uhlich), Lumogen Yellow D0790 (BASF Corp.), Suco-Gelb L1250 (BASF Corp.), Suco-Yellow D1355 (BASF Corp.), Hostaperm® Pink E (American Clariant), Fanal Pink D4830 (BASF Corp.), Cinquasia Magenta (DuPont), Lithol Scarlet D3700 (BASF Corp.), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF Corp.), Bon Red C (Dominion Color Company), Royal Brilliant Red RD-8192 (Paul Uhlich), Oracet Pink RF (Ciba), Paliogen® Red 3871 K (BASF Corp.), Paliogen® Red 3340 (BASF), and Lithol Fast Scarlet L4300 (BASF Corp.).

In one particular embodiment, the anionic pigment is a carbon black pigment having a styrene acrylic polymer covalently bound to its surface. The styrene acrylic polymer has an acid number of approximately 165 and a molecular weight of approximately 8,000. This polymer-attached pigment is available from Cabot Corp. (Boston, Mass.). The styrene acrylic polymer is present on the carbon black from approximately 20% to approximately 30% of the pigment weight.

In addition to water, the ink vehicle of the inkjet ink may include at least one of the binder, the surfactant, and the organic solvent(s). The binder may be an anionic polymer or a mixture of anionic polymers that is soluble under basic conditions, such as in a basic aqueous solution. The anionic polymer may have carboxyl, carbonyl, hydroxyl, sulfonic, sulfuric, or phosphonic groups that provide the negative charge. The binder may be present in the inkjet ink from approximately 0.1 wt % to approximately 11 wt %. In one particular embodiment, the binder is present at less than or equal to approximately 2 wt %. By reducing the amount of binder in the inkjet ink to less than or equal to approximately 2 wt %, the anionic pigment may be easily precipitated on the print medium, improving the mottle of the printed image.

The anionic binder may have an acid number that ranges from approximately 40 to approximately 160 and an average molecular weight that ranges from approximately 4,000 to approximately 10,000, as measured by gel permeation chromatography ("GPC"). Examples of binders that may be used in the inkjet ink include styrene acrylic polymers, polyurethane polymers, or mixtures of polyurethane and styrene acrylic polymers. The styrene acrylic binder may include, but is not limited to, JONCRYL® 611, JONCRYL® 586, JONCRYL® 683, and mixtures thereof. These styrene acrylic binders are available from Johnson Polymer bv (Heerenveen, The Netherlands). JONCRYL® 611 has an acid number of approximately 53, JONCRYL® 586 has an acid number of approximately 108 and a molecular weight of approximately 4,600, and JONCRYL® 683 has an acid number of approximately 165 and a molecular weight of 8,000. The acrylic binder may be present in the inkjet ink from approximately 0.1 wt % to approximately 6 wt %.

The polyurethane binder may have an acid number of approximately 55 and a molecular weight of approximately 5,500. Polyurethane binders are commercially available from numerous sources, such as from Avecia Ltd. (Manchester, England). The polyurethane binder may be present in the inkjet ink from approximately 0 wt % to approximately 5 wt %. In one particular embodiment, the acrylic binder is Joncryl® 586 and the polyurethane binder has an acid number of approximately 55 and a molecular weight of approximately 5,500.

To increase the solubility of the binder, the inkjet ink may include a base, such as an organic or an inorganic base. Examples of organic bases include, but are not limited to, monoethanolamine, diethanolamine, triethanolamine, aminomethylpropanol, and ammonia. Examples of inorganic bases include, but are not limited to, potassium hydroxide and sodium hydroxide. The inkjet ink may have a pH ranging from approximately 8.0 to approximately 10.0, such as from approximately 9.0 to approximately 9.5.

The surfactant used in the inkjet ink may be a nonionic surfactant, such as a nonionic ether surfactant, polyoxyethyleneoleic acid, a nonionic ester surfactant, or a nonionic fluorosurfactant. Examples of ether surfactants include, but are not limited to, a polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether. Examples of ester surfactants include, but are not limited to, a polyoxyethyleneoleic ester, polyoxyethylenedistearic ester, sorbitan laurate, sorbitan monoutearate, sorbitan monooleate, sorbitan sesquioleate, polyoxyethylene monooleate, and polyoxyethylene stearate. The fluorosurfactant may include, but is not limited to, a fluoroalkyl ester and salts of perfluoroalkylcarboxylic acids. Specific examples of nonionic surfactants include, but are not limited to, the Tetronic® series available from BASF Canada (Toronto, Ontario), the Tergitol® series available from Union Carbide Co. (Houston, Tex.), the Brij® series available from ICI Americas (Wilmington, Del.), the Surfynol® series available from Air Products (Allentown, Pa.), the Triton® series available from Rohm & Haas (Philadelphia, Pa.), the Aerosol® series available from Cytec Industries, Inc. (West Paterson, N.J.), the Zonyl® series of fluoropolymers available from DuPont (Wilmington, Del.), and the Neodol® series available from Shell Chemicals, LP (Houston, Tex.). The Tetronic® surfactants are tetrafunctional block copolymers of propylene oxide, ethylene oxide, and ethylene diamine. The Tergitol® surfactants are alkyl polyethylene oxides. The Brij® surfactants are polyethoxylated alcohols and esters. The Surfynol® surfactants are acetylenic polyethylene oxides. The Triton® surfactants are alkyl phenyl polyethylene oxides. In one particular embodiment, the nonionic surfactant is Zonyl® FSO. Zonyl® FSO is an ethoxylated nonionic fluorosurfactant having the structure $RfCH_2CH_2O(CH_2CH_2O)_xH$, where Rf is $F(CF_2CF_2)_y$, x is 0 to approximately 15, and y is approximately 1 to approximately 7. As supplied, Zonyl® FSO has 50% solids.

The surfactant may be present in the inkjet ink at low amounts, such as from approximately 0.01 wt % to approximately 1.0 wt %. In one particular embodiment, the surfactant is present at less than or equal to approximately 0.1 wt %. By reducing the amount of the surfactant to less than or equal to approximately 0.1 wt %, a rate of penetration of the inkjet ink into the print medium may decrease, improving the mottle of the printed image.

The inkjet ink may include less than or equal to approximately 20 wt % of the organic solvents, which are water soluble or water miscible. The organic solvents may include, but are not limited to, glycols, ethers, alcohols, and amides. Examples of organic solvents that may be used include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of organic solvents that may be used in the inkjet ink include, but are not limited to, 2-pyrrolidone, 1,2-hexanediol, tripropylene glycol, and mixtures thereof. The 2-pyrrolidone may be present from approximately 0 wt % to approximately 15 wt %, the 1,2-hexanediol may be present from approximately 0 wt % to approximately 8 wt %, and the tripropylene glycol may be present from approximately 0 wt % to approximately 15 wt %. By reducing the concentration of the organic solvents to less than or equal to approximately 20 wt %, the penetration rate of the inkjet ink on the print medium may decrease, improving the mottle of the printed image.

The inkjet ink may be formulated or prepared by conventional techniques, such as by direct mixing of the anionic pigment, the binder(s), the surfactant, the organic solvents, water, and any other ingredients of the inkjet ink. The anionic pigment may be dispersed in the inkjet ink by conventional techniques, such as in a horizontal mini mill or a ball mill.

The inkjet ink may be applied to the print medium with the fixer fluid, which includes a cationic fixing agent dissolved in an aqueous ink vehicle. The ink vehicle of the fixer fluid may also include water-soluble or water-miscible organic solvents or nonionic surfactants. Examples of organic solvents and nonionic surfactants for use in the fixer fluid include those previously described for use in the inkjet ink. The cationic fixing agent may include a cationic polymer and an acidic or ionic crashing agent. When the inkjet ink and the fixer fluid are applied to the print medium, the cationic polymer in the fixer fluid may react with ingredients in the inkjet ink that have the opposite charge. For instance, the cationic polymer may react with the anionic or anionizable group on the anionic pigment, fixing the anionic pigment to the print medium.

The cationic polymer may be a quaternary amine, a polyamine, such as a polyethyleneimine ("PEI"), a polyguanidine cationic polymer, a water-soluble cationic dendrimer, a water-dispersed alkoxylated form of polyethyleneimine, a water-dispersed alkoxylated form of a dendrimer, a water-soluble alkoxylated form of a dendrimer, polyallylamine, poly diallyl dimethyl ammonium chloride, or a polyvinyl pyrrolidone. The polyguanidine cationic polymer may include, but is not limited to, hexamethylene guanide ("HMG"), a polymer of hexamethylene biguanide ("HMB"), and a copolymer of HMB and HMG. PHMB is available from Avecia Ltd. (Manchester, England). The cationic polymer may be present in the fixer fluid from approximately 0.2 wt % to approximately 10 wt %, such as from approximately 0.5 wt % to approximately 7 wt %.

The acidic crashing agent may be an organic acid, an inorganic acid, or mixtures thereof. The acidic crashing agent may convert the cationic polymer into a quaternized form. Examples of organic acids that may be used include, but are not limited to, citric acid, succinic acid, phosphoric acid, glycolic acid, acetic acid, and mixtures thereof. An example of an inorganic acid that may be used includes hydrochloric acid. The acidic crashing agent may be present in the fixer fluid from approximately 0.05 wt % to approximately 8 wt % of the total weight of the fixer fluid. In one particular embodiment, the fixer fluid is an aqueous solution that includes 2% succinic acid and 2% of HMG.

The fixer fluid may be formulated or prepared by conventional techniques, such as by direct mixing of the cationic polymer, the acidic crashing agent, water, and any other ingredients of the fixer fluid. The pH of the fixer fluid may be adjusted to increase the solubility of the ingredients of the fixer fluid. The pH of the fixer fluid may range from approximately 2.0 to approximately 6.0. In one embodiment, the pH of the fixer fluid is approximately 4.0.

The inkjet ink may be stored in an inkjet pen of a conventional inkjet printer, such as an HP DeskJet® printer manufactured by Hewlett-Packard Co. (Palo Alto, Calif.). The fixer fluid may be stored in a fifth pen, or a fixer pen, of the inkjet printer. The inkjet printer may be modified to include the fifth pen, which is similar to a conventional inkjet pen used to print color or black inkjet inks. This modification is known in the art and, therefore, is not described in detail herein. The inkjet ink and the fixer fluid may form an inkjet printing system.

When the inkjet ink and the fixer fluid are applied to the print medium, the anionic or anionizable groups on the anionic pigment may react with the cationic fixing agent to precipitate the anionic pigment on the print medium. The cationic fixing agent may act as a bulky, multivalent counterion to the anionic pigment, reducing its solubility and mobility. The fixer fluid may be under- or over-printed relative to the inkjet ink. Alternatively, the fixer fluid and the inkjet ink may be deposited on the print medium at approximately the same time or multiple layers of each of the fixer fluid and the inkjet ink may be deposited on the print medium.

To achieve good mottle without substantially affecting the OD, durability, decap, or drytime, the anionic pigment may be fixed to the print medium by the cationic polymer of the fixer fluid. Since other anionically charged ingredients in the inkjet ink may potentially compete for the cationic polymer, the amount of anionically charged ingredients in the inkjet ink may be reduced to provide effective fixing of the anionic pigment. In other words, the amount of the charged species in the inkjet ink, such as the binder, may be present at less than or equal to approximately 2%. As such, the cationic fixing agent may more effectively precipitate the anionic pigment on the surface of the print medium.

Without being tied to a particular theory, it is believed that by reducing the amount of the charged species in the inkjet ink, such as by reducing the amount of the anionic binder to less than or equal to approximately 2%, the cationic fixing agent may more effectively precipitate the anionic pigment on the print medium, reducing the mottled appearance of the printed image. Furthermore, by reducing the amount of the surfactant and the concentration of the organic solvents in the inkjet ink, the penetration rate of the inkjet ink into the print medium may be decreased. The cationic fixing agent may then precipitate the anionic pigment closer to the surface of the print medium, further reducing the mottle appearance.

The image printed with the inkjet printing system of the present invention may have an improved mottled appearance compared to the appearance of an image printed with a conventional inkjet ink. For instance, when a black inkjet ink is used to print a solid black area in combination with the fixer fluid, the resulting printed image may have a uniform, black appearance. The extent of mottle may be determined visually by observing the printed area and ranking its appearance on a scale of 1 (worst) to 10 (best). The visible mottle ranking of the inkjet printing system of the present invention may be greater than or equal to approximately 7 (out of 10). In one embodiment, the visible mottle rating is greater than or equal to approximately 8. The printed image may also exhibit comparable or improved OD, which is measured by conventional techniques, such as by measuring the blackness of the printed area with a spectrophotometer versus the blackness of a standard.

The print medium upon which the inkjet ink and fixer fluid are applied may be a porous paper. As used herein, the term "porous paper" refers to a conventional plain paper or office paper. Examples of porous papers include, but are not limited to, Gilbert Bond, Georgia-Pacific Multi-System®, Aussedat-Rey-Reymat, Champion DataCopy, Enso-Gutzeit Berga Laser, Hammermill® Fore DP, Honshu New Yamayuri, Hokuestsu kin-Mari, KymCopy Lux, MoDo DataCopy, Neenah Classic Laid, Oji Sunace PPC, Stora Papyrus Multi-Copy, Union Camp Great White®, Weyerhauser First Choice®, and Wiggens Teape Conqueror®. The print medium may also be a specialty print medium, such as a glossy print medium or a brochure print medium. Examples of glossy print media include, but are not limited to, HP Premium Plus Photo printer paper, which is available from Hewlett-Packard Co. (Palo Alto, Calif.), Epson photo paper, Pictorico premium photo glossy, Agfa glossy photo inkjet paper, Konica photo inkjet paper, Canon glossy photo paper, Hammermill® Jetprint Ultra Gloss, Polaroid inkjet paper, and Kodak inkjet photo quality-photo weight paper.

The following examples serve to explain embodiments of the present invention in more detail. These examples are not to be construed as being exhaustive or exclusive as to the scope of this invention.

EXAMPLES

Example 1

Effect of Binder Concentration, Surfactant Concentration, and Organic Solvent Concentration on Mottle and OD Inkjet ink formulations having the following ingredients were formulated. All ingredients are expressed as weight percent of the total weight of the inkjet ink.

TABLE 1

Formulations of Tested Inkjet Inks.

| Formulation | A | B | C | D | E | F | G |
|---|---|---|---|---|---|---|---|
| Anionic carbon black pigment | 3 | 3 | 3 | 3 | 3 | 3 | 3 |
| Joncryl ® 586 | 0.8 | 0.6 | 0.4 | 1.8 | 1.8 | 1.8 | 1.8 |
| Polyurethane binder | 1.2 | 1.2 | 1.2 | 0 | 0 | 0 | 0 |
| Zonyl ® FSO | 0.03 | 0.03 | 0.03 | 0.03 | 0.03 | 0.1 | 0.03 |
| 2-pyrrolidone | 7 | 7 | 7 | 4 | 7 | 2.7 | 2.7 |
| 1,2 hexanediol | 4 | 4 | 4 | 4 | 4 | 4 | 4 |
| Tripropylene glycol | 8 | 8 | 8 | 4 | 0 | 0 | 0 |
| Proxel ® GXL | 0.2 | 0.2 | 0.2 | 0.2 | 0.2 | 0.2 | 0.2 |
| Water | balance | balance | balance | balance | balance | balance | balance |

As previously described, the anionic pigment was obtained from Cabot Corp. and included a styrene acrylic polymer having an acid number of approximately 165 and a molecular weight of approximately 8,000 attached to the carbon black pigment. Joncryl® 586 was obtained from Johnson Polymer bv. The polyurethane binder, having an acid number of approximately 55 and a molecular weight of approximately 5,500, was obtained from Avecia Ltd. Proxel® GXL is a biocide that includes a solution of 1,2-benzisothiazolin-3-one (BIT), sodium hydroxide, and dipropylene glycol and was obtained from Avecia Ltd. The inkjet inks were prepared by mixing the ingredients, as known in the art. Formulations A-C vary in that they include decreasing amounts of Joncryl® 586 as the binder. Formulations D and E vary in that they include decreasing amounts of the organic solvents. Formulations F and G vary in that they include decreasing amounts of Zonyl® FSO as the surfactant.

A fixer fluid formulation having an aqueous solution of 2% succinic acid and 2% of a polyguanidine cationic polymer was also prepared. The fixer fluid was prepared by mixing the ingredients, as known in the art.

Samples were printed using each of the inkjet ink formulations described in Table 1 and the fixer fluid. The fixer fluid was underprinted relative to the inkjet ink. Each of the printed samples was visually rated for mottle, the results of which are shown in Table 2. The extent of mottle was ranked from 1 (worst) to 10 (best). In addition, OD for each of the printed samples was measured with a Macbeth spectrophotometer versus a standard. The OD results are also shown in Table 2.

TABLE 2

Mottle and OD Results of Images Printed with the Inkjet Inks and Fixer Fluid.

| Formulation | A | B | C | D | E | F | G |
|---|---|---|---|---|---|---|---|
| Mottle | 4 | 6 | 7 | 7 | 8 | 7 | 8 |
| OD | 1.31 | 1.34 | 1.4 | 1.38 | 1.43 | 1.31 | 1.35 |

As shown in Table 2, decreasing the binder concentration in the inkjet ink improved the mottle and OD of the printed image. Decreasing the organic solvent concentration in the inkjet ink also improved the mottle and OD of the printed image. In addition, decreasing the surfactant concentration improved the mottle and OD.

The improvements in the mottle of the printed images were achieved without substantially affecting the durability of the printed image, the decap of the inkjet ink, or the drytime of the inkjet ink.

While the invention may be susceptible to various modifications and alternative forms, specific embodiments have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An inkjet printing system, comprising:
    a fixer fluid comprising a cationic polymer and an acidic crashing agent; and
    an inkjet ink comprising an anionic pigment and at least one of the following:
        at least one nonionic surfactant present in the inkjet ink at less than or equal to approximately 0.1% by weight;
        at least one anionic binder present in the inkjet ink at less than or equal to approximately 2% by weight; and
        less than or equal to approximately 20% by weight of at least one organic solvent;
        wherein an image printed using the inkjet printing system exhibits a visual mottle ranking greater than or equal to 8.

2. The inkjet printing system of claim 1, wherein the cationic polymer is selected from the group consisting of polyethyleneimine, a polyguanidine cationic polymer, a water-soluble cationic dendrimer, a water-dispersed alkoxylated form of polyethyleneimine, a water-dispersed alkoxylated form of a dendrimer, a water-soluble alkoxylated form of a dendrimer, polyallylamine, poly diallyl dimethyl ammonium chloride, and polyvinyl pyrrolidone.

3. The inkjet printing system of claim 2, wherein the polyguanidine cationic polymer is selected from the group consisting of hexamethylene guanide, a polymer of hexamethylene biguanide, and a copolymer of hexamethylene biguanide and hexamethylene guanide.

4. The inkjet printing system of claim 1, wherein the acidic crashing agent comprises citric acid, succinic acid, phosphoric acid, glycolic acid, acetic acid, or mixtures thereof.

5. The inkjet printing system of claim 1, wherein the anionic pigment is present in the inkjet ink in an amount ranging from approximately 1% by weight to approximately 30% by weight.

6. The inkjet printing system of claim 1, wherein the anionic pigment is present in the inkjet ink in an amount ranging from approximately 1% by weight to approximately 10% by weight.

7. The inkjet printing system of claim 1, wherein the anionic pigment comprises carbon black having a styrene acrylic polymer with an acid number of approximately 165 covalently attached to a surface of the carbon black.

8. The inkjet printing system of claim 1, wherein the at least one nonionic surfactant is an ethoxylated nonionic fluorosurfactant having the structure $RfCH_2CH_2O(CH_2CH_2O)_xH$, where Rf is $F(CF_2CF_2)_y$, x is 0 to 15, and y is 1 to 7.

9. The inkjet printing system of claim 1, wherein the at least one anionic binder has an acid number that ranges from approximately 40 to approximately 160 and a molecular weight that ranges from approximately 4,000 to approximately 10,000.

10. The inkjet printing system of claim 1, wherein the at least one anionic binder is soluble at a pH ranging from approximately 8.0 to approximately 10.0.

11. The inkjet printing system of claim 1, wherein the at least one anionic binder is soluble at a pH ranging from approximately 9.0 to approximately 9.5.

12. The inkjet printing system of claim 1, wherein the at least one anionic binder is selected from the group consisting of a styrene acrylic polymer, a polyurethane polymer, and mixtures thereof.

13. The inkjet printing system of claim 12, wherein the polyurethane polymer has an acid number of approximately 55 and a molecular weight of approximately 5,500.

14. The inkjet printing system of claim 12, wherein the styrene acrylic polymer has an acid number of approximately 108 and a molecular weight of approximately 4,600.

15. The inkjet printing system of claim 1, wherein the at least one organic solvent is selected from the group consisting of 2-pyrrolidone, 1,2-hexanediol, tripropylene glycol, and mixtures thereof.

16. A method of producing an inkjet printing system, comprising:
formulating an inkjet ink comprising an anionic pigment dispersed in an ink vehicle, the ink vehicle comprising at least one of the following:
at least one nonionic surfactant present in the inkjet ink at less than or equal to approximately 0.1% by weight;
at least one anionic binder present in the inkjet ink at less than or equal to approximately 2% by weight; and
less than or equal to approximately 20% by weight of at least one organic solvent; and
formulating a fixer fluid comprising a cationic polymer and an acidic crashing agent;
wherein an image printed using the inkjet printing system exhibits a visual mottle ranking greater than or equal to 8.

17. The method of claim 16, wherein formulating the inkjet ink comprising the anionic pigment dispersed in the ink vehicle comprises formulating the inkjet ink to include carbon black having a styrene acrylic polymer with an acid number of approximately 165 covalently attached to a surface of the carbon black.

18. The method of claim 16, wherein formulating the inkjet ink comprising the anionic pigment dispersed in the ink vehicle comprises formulating the inkjet ink to include an ethoxylated nonionic fluorosurfactant having the structure $RfCH_2CH_2O(CH_2CH_2O)_xH$, where Rf is $F(CF_2CF_2)_y$, x is 0 to 15, and y is 1 to 7.

19. The method of claim 16, wherein formulating the inkjet ink comprising the anionic pigment dispersed in the ink vehicle comprises formulating the inkjet ink to include the at least one anionic binder having an acid number that ranges from approximately 40 to approximately 160 and a molecular weight that ranges from approximately 4,000 to approximately 10,000.

20. The method of claim 16, wherein formulating the inkjet ink comprising the anionic pigment dispersed in the ink vehicle comprises formulating the inkjet ink to include the at least one anionic binder that is soluble at a pH ranging from approximately 8.0 to approximately 10.0.

21. The method of claim 16, wherein formulating the inkjet ink comprising the anionic pigment dispersed in the ink vehicle comprises formulating the inkjet ink to include the at least one anionic binder that is soluble at a pH ranging from approximately 9.0 to approximately 9.5.

22. The method of claim 16, wherein formulating the inkjet ink comprising the anionic pigment dispersed in the ink vehicle comprises formulating the inkjet ink to include the at least one anionic binder selected from the group consisting of a styrene acrylic polymer, a polyurethane polymer, and mixtures thereof.

23. The method of claim 22, wherein the polyurethane polymer has an acid number of approximately 55 and a molecular weight of approximately 5,500.

24. The method of claim 22, wherein the styrene acrylic polymer has an acid number of approximately 108 and a molecular weight of approximately 4600.

25. The method of claim 16, wherein formulating the inkjet ink comprising the anionic pigment dispersed in the ink vehicle comprises formulating the inkjet ink to include the at least one organic solvent selected from the group consisting of 2-pyrrolidone, 1,2-hexanediol, tripropylene glycol, and mixtures thereof.

26. The method of claim 16, wherein formulating the fixer fluid comprising the cationic polymer and the acidic crashing agent comprises formulating the fixer fluid to include a polyguanidine cationic polymer selected from the group consisting of hexamethylene guanide, a polymer of hexamethylene biguanide, and a copolymer of hexamethylene biguanide and hexamethylene guanide.

27. The method of claim 16, wherein formulating the fixer fluid comprising the cationic polymer and the acidic crashing agent comprises formulating the fixer fluid to include citric acid, succinic acid, phosphoric acid, glycolic acid, acetic acid, or mixtures thereof.

28. A method of printing an image having improved mottle, the method comprising:
applying an inkjet ink to a print medium, the inkjet ink comprising an anionic pigment dispersed in an ink vehicle, the ink vehicle comprising at least one of the following:
at least one nonionic surfactant present in the inkjet ink at less than or equal to approximately 0.1% by weight;
at least one anionic binder present in the inkjet ink at less than or equal to approximately 2% by weight; and
less than or equal to approximately 20% by weight of at least one organic solvent; and
applying a fixer fluid to the print medium, the fixer fluid comprising a cationic polymer and an acidic crashing agent;
wherein the image exhibits a visual mottle ranking greater than or equal to 8.

29. The method of claim 28, wherein applying the inkjet ink to the print medium comprises applying the inkjet ink that includes carbon black having a styrene acrylic polymer with an acid number of approximately 165 covalently attached to a surface of the carbon black.

30. The method of claim 28, wherein applying the inkjet ink to the print medium comprises applying the inkjet ink that includes an ethoxylated nonionic fluorosurfactant having the structure $RfCH_2CH_2O(CH_2CH_2O)_xH$, where Rf is $F(CF_2CF_2)_y$, x is 0 to 15, and y is 1 to 7.

31. The method of claim 28, wherein applying the inkjet ink to the print medium comprises applying the inkjet ink that includes the at least one anionic binder having an acid number that ranges from approximately 40 to approximately 160 and a molecular weight that ranges from approximately 4,000 to approximately 10,000.

32. The method of claim 28, wherein applying the inkjet ink to the print medium comprises applying the inkjet ink that includes the at least one anionic binder that is soluble at a pH ranging from approximately 8.0 to approximately 10.0.

33. The method of claim 28, wherein applying the inkjet ink to the print medium comprises applying the inkjet ink that includes the at least one anionic binder selected from the group consisting of a styrene acrylic polymer, a polyurethane polymer, and mixtures thereof.

34. The method of claim 33, wherein the polyurethane polymer has an acid number of approximately 55 and a molecular weight of approximately 5,500.

35. The method of claim 33, wherein the styrene acrylic polymer has an acid number of approximately 108 and a molecular weight of approximately 4,600.

36. The method of claim 28, wherein applying the inkjet ink to the print medium comprises applying the inkjet ink that includes the at least one organic solvent selected from the group consisting of 2-pyrrolidone, 1,2-hexanediol, tripropylene glycol, and mixtures thereof.

37. The method of claim 28, wherein applying the inkjet ink to the print medium comprises applying the inkjet ink to a porous paper.

38. The method of claim 28, wherein applying the fixer fluid to the print medium comprises applying the fixer fluid that includes a polyguanidine cationic polymer selected from the group consisting of hexamethylene guanide, a polymer of hexamethylene biguanide, and a copolymer of hexamethylene biguanide and hexamethylene guanide.

39. The method of claim 28, wherein applying the fixer fluid to the print medium comprises applying the fixer fluid that includes citric acid, succinic acid, phosphoric acid, glycolic acid, acetic acid, or mixtures thereof.

40. The inkjet printing system of claim 1 wherein the image printed using the inkjet printing system exhibits the mottle that is greater than or equal to 8 without affecting optical density.

41. The inkjet printing system of claim 40 wherein the image printing using the inkjet printing system exhibits an optical density ranging from about 1.31 to about 1.4.

* * * * *